(12) United States Patent  
Poole

(10) Patent No.: US 6,830,349 B2  
(45) Date of Patent: Dec. 14, 2004

(54) BLACK BODY BACKGROUND FOR IMAGING

(75) Inventor: Gavin H. Poole, Slidell, LA (US)

(73) Assignee: Institute for Technology Development, Jackson, MI (US)

( * ) Notice: Subject to any disclaimer, the term of this patent is extended or adjusted under 35 U.S.C. 154(b) by 0 days.

(21) Appl. No.: 10/144,788

(22) Filed: May 15, 2002

(65) Prior Publication Data

US 2003/0214721 A1 Nov. 20, 2003

(51) Int. Cl.[7] .............................................. G02B 27/00
(52) U.S. Cl. ...................... 359/614; 359/601; 359/613
(58) Field of Search ................................. 359/614, 601, 359/613, 579, 599, 896

(56) References Cited

U.S. PATENT DOCUMENTS

| | | | |
|---|---|---|---|
| 3,215,054 A | 11/1965 | Hamilton ........................ | 95/75 |
| 4,674,491 A | * 6/1987 | Brugger et al. ........ | 128/200.14 |
| 5,144,524 A | 9/1992 | Tullis et al. ................. | 362/293 |
| 5,452,135 A | 9/1995 | Maki et al. .................. | 359/834 |
| 5,519,534 A | * 5/1996 | Smith et al. ................. | 359/599 |
| 5,745,293 A | 4/1998 | Lassalle ....................... | 359/614 |
| 6,166,373 A | 12/2000 | Mao ........................... | 250/226 |
| 6,220,715 B1 | 4/2001 | Fischer et al. ............... | 359/614 |
| 6,626,052 B1 | * 9/2003 | Martin et al. .............. | 73/865.6 |

OTHER PUBLICATIONS

"A Guide to Integrating Sphere Theory and Applications" – Tech Guide, pp. 2–19.

* cited by examiner

Primary Examiner—Mohammad Sikder  
(74) Attorney, Agent, or Firm—Crowell & Moring LLP

(57) ABSTRACT

A light trap suitable for use in an optical imaging system includes a hollow sphere, with a hollow cylindrical tube attached substantially tangent to the surface of the sphere, and forming a chimney. The interior and exterior surfaces of the sphere are coated with a low-reflective coating, such as flat black paint. A sample to be imaged is placed over the opening of the chimney with an imaging system and illumination source directed downward into the chimney itself. Light which passes through or around the sample is captured in the sphere, so that it is not reflected back into the imaging system.

14 Claims, 4 Drawing Sheets

BLACK BODY BACKGROUND FOR IMAGING

BACKGROUND OF THE INVENTION

The present invention is directed to a black body background in the form of a light trap suitable for use in an optical imaging system.

Optical imaging systems are known in which an object, such as a sample which is being evaluated, is illuminated with electromagnetic radiation, and radiation reflected by the sample is detected by an imaging device such as a camera or an optical scanner, as shown in FIG. 1. The information gathered in this manner may be digitized and stored for processing in a digital computer. The reflected radiation may be detected in a plurality of spectral bands in a process known as multispectral or hyperspectral imaging. See, for example, U.S. Pat. No. 6,166,373 to Chengye Mao issued Dec. 26, 2000. Numerous such systems are known. By analyzing the spectral information gathered in this manner, it is possible to evaluate physical characteristics of the sample, as well as its composition.

An important consideration in such imaging systems is to assure that the radiation sampled by camera or optical scanner is limited exclusively to that which is reflected by the sample. For this purpose, it is conventional to place the sample in front of a non-reflecting surface, such as a flat black painted surface or a non-reflective black textile material. The idea is to prevent any light that has penetrated or gone around the sample from reflecting off the background and back into the camera or scanner. This allows for the capture of a more pure spectral signature from the sample.

Various arrangements have been proposed for reducing the amount of reflected radiation which emanates from the background surface in imaging and scanning systems such as described above. For example, U.S. Pat. No. 5,144,524 discloses the use of an antireflectance film to prevent scanning light from being scattered by particle contamination on a target surface. U.S. Pat. No. 5,745,293, on the other hand, discloses a light trap for use in optical systems and instruments, in which unwanted light is guided into a light trap in the form of an enclosure containing a conical body which is disposed in the light path. The light is attenuated by reflecting it in all directions from the conical body that facilitates its absorption by the internal walls of the enclosure.

U.S. Pat. No. 6,220,715 discloses a light trap that includes a spherical enclosure, with an opening for receiving a light beam. The interior of the enclosure has a light absorbing surface as well as a polished spheroidal reflector body that is disposed in the path of light that enters through the opening. The reflector disperses the incoming light within the sphere so that it can be absorbed.

The purpose of the present invention is to provide a light trap structure that is simple, inexpensive and easy to manufacture, and is suitable for use as a black body background in an imaging system such as described above.

Another object of the invention is to provide such a light trap structure that efficiently traps spurious radiation incident therein.

These and other objects and advantages are achieved by the light trap structure according to the invention, which includes a hollow sphere, with a hollow tube attached to one side in the form of a chimney. The sphere and chimney are coated (inside and out) with a low reflective coating, such as flat black paint, although any low reflectivity coating can be used. The sample to be imaged is placed on top of the chimney with the imaging system and lights above, aiming down into the chimney. Any light that passes through the sample is "captured" in the sphere section, so that it cannot reflect back to the imaging system.

The light trap according to the invention is extremely simple and effective. Initial tests have indicated a 75% reduction in reflected light, when compared to the same materials and coatings used in traditional setups (i.e., flat surfaces).

Other objects, advantages and novel features of the present invention will become apparent from the following detailed description of the invention when considered in conjunction with the accompanying drawings.

DETAILED DESCRIPTION OF THE DRAWINGS

Figure 1:
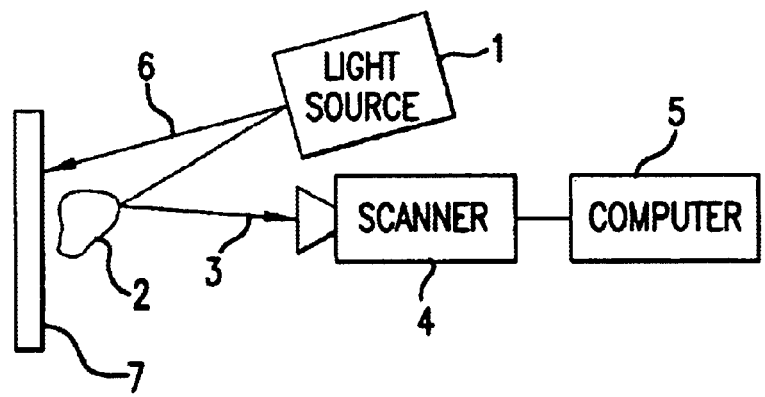
FIG. 1 shows an imaging system in which a sample is illuminated by a radiation source and imaged by a scanner or camera.

FIG. 1 is a depiction of a conventional optical imaging or scanning arrangement in which a light source (1) irradiates an object of interest or "sample" (2), which is to be evaluated, with electromagnetic radiation, which may be visible light or may be beyond the visible spectrum. Reflected radiation (3) from the sample is collected by the scanner (4), digitized and transmitted to the computer (5) for analysis. In such a system, it is important that light (6) that is incident on the background element (7) not be reflected and captured by the scanner (4), which would result in a degradation of the integrity of the image data collected.

Figure 2:
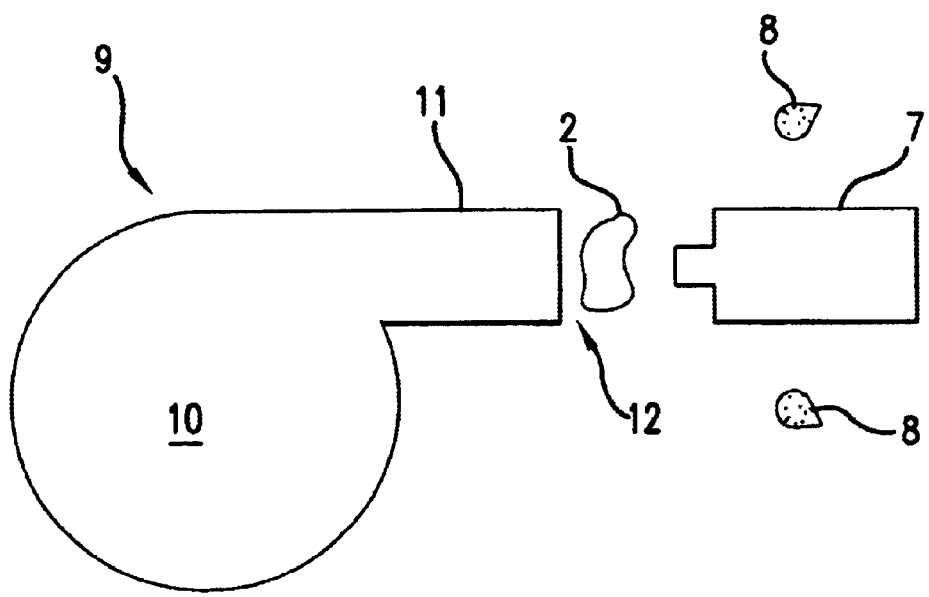
FIG. 2 is a schematic depiction of a light trap according to the invention incorporated in an imaging system.

FIG. 2 is a schematic side view of the light trap system according to the invention, together with an imaging system (7) and illumination sources (8). The light trap (9) in this embodiment consists of a hollow sphere (10), with a hollow tube (11) attached to one side in the manner of a chimney. As noted previously, the interior and exterior surfaces of both the sphere and the chimney are coated with a low reflectance coating, such as a coat of flat black paint. (In tests conducted so far, a commercially available flat black paint, such as is marketed under the trade name Krylon™ has been used effectively.)

In use, a sample (2) which is to be imaged is placed on top of the chimney (11), with the imaging system (7) and the illumination sources (8) aimed into the opening of the chimney.

According to one aspect of the invention, the chimney (11) is situated at the peripheral edge of the sphere (10), so that a longitudinal peripheral edge of the chimney (11) joins the sphere (10) approximately tangent to its surface. In this manner, light that enters the opening (12) of the chimney (11) is directed into the body of the sphere (10) where it is attenuated and absorbed by the light absorbent coating on the interior of the sphere. This simple arrangement of the sphere and chimney eliminates the need for elaborate structural elements contained within the interior of the sphere (10), such as a conical element or spheroidal element which is necessary with prior art devices.

According to another feature of the invention, for optimum use, no more than 5% of the total surface area of the sphere should be removed by the opening made by the intersection of the cylindrical chimney (11) with the sphere (10) itself.

The light-trap according to the invention may be made out of any rigid material that can be shaped into a sphere and be made smooth on its interior surface. Suitable materials include wood, plaster or plastics, and the like. Optimally, the light trap can also be made out of a metal, such as aluminum. For ease of providing the interior surface with a non-reflective coating, it may be made in two halves, which can be held together in any suitable manner, including external flange(s).

In one embodiment, the light trap according to the invention was manufactured in two halves using Nylon™, in a process known as selective laser sintering, in which a carbon dioxide laser selectively draws a cross-section of the object on a layer of Nylon™ powder. As the laser draws the cross-section, it selectively "sinters" (heats and fuses) the powder, creating a solid mass that represents one cross-section of the part. The system spreads more powder and sinters layer after layer until the object is complete. Other suitable techniques for manufacturing the sphere and chimney are of course well known to those skilled in the art.

Figure 3C:
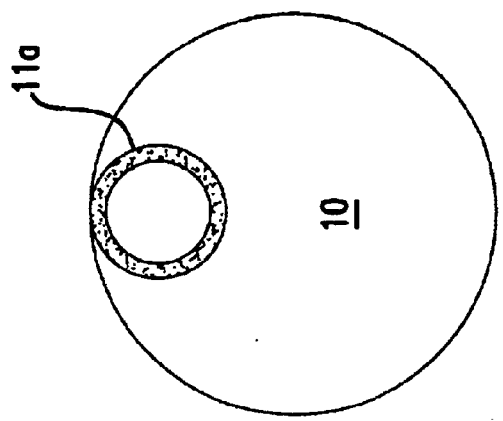
FIGS. 3a–c are respective side, front and top views of an embodiment of the light trap according to the invention.
Figure 3B:
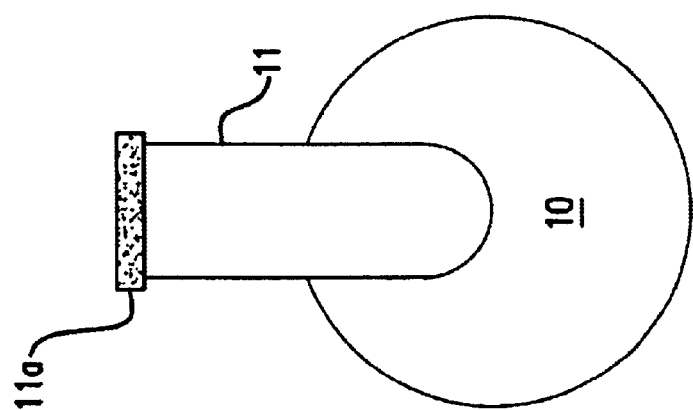
Figure 3A:
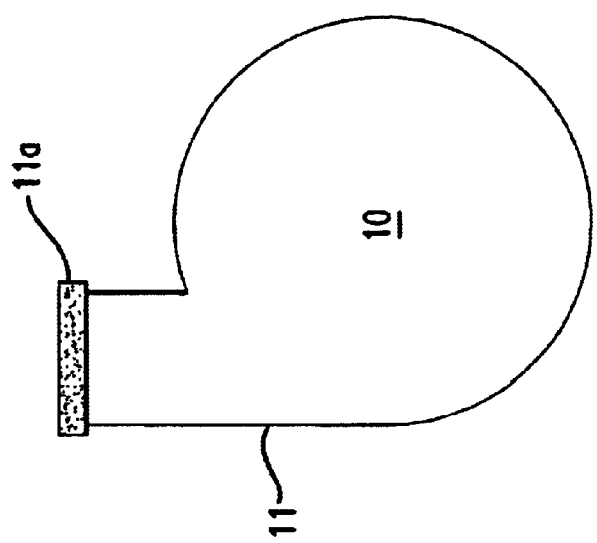
Figure 4B:
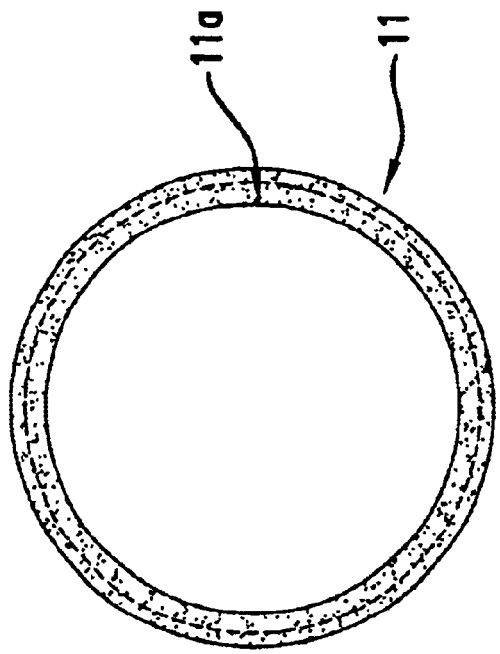
FIG. 4 shows the construction of a chimney portion of the light trap of FIG. 3, in greater detail.
Figure 4A:
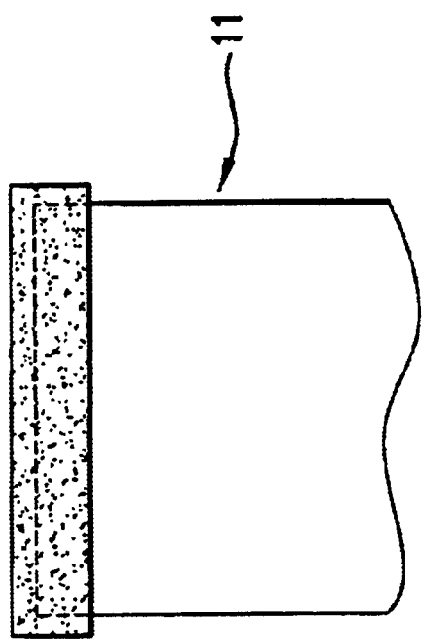

FIGS. 3a, 3b and 3c show respective side, front and top views of the light trap according to the invention, including the sphere (10) and chimney (11). As can be seen in each of these views, the opening of the chimney includes an exterior overhang, or lip (11a), which is included in order to reduce the amount of light which might otherwise be reflected back out of the chimney due to some reflectivity of the surface immediately inside the chimney opening. This exterior overhang is shown in somewhat greater detail in FIGS. 4a and 4b.

Figure 5:
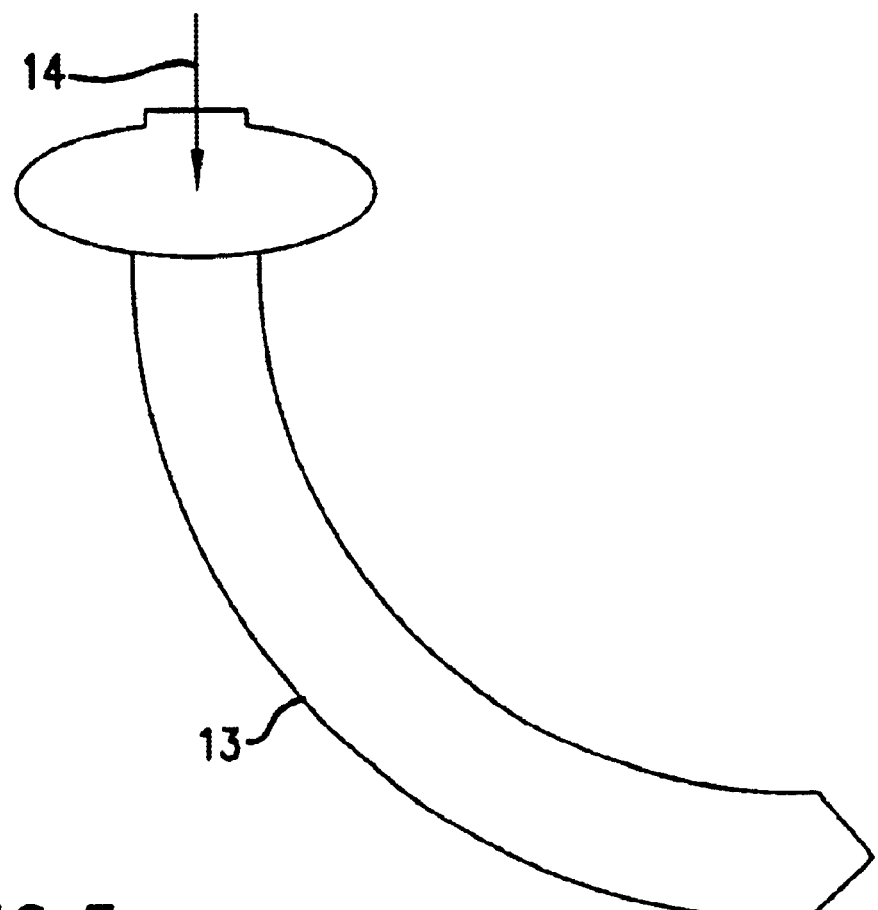
FIG. 5 is a schematic depiction of another embodiment of the light trap according to the invention.

In another embodiment of the invention, depicted in FIG. 5, an elongated curved tubular member (13) may be substituted for the sphere (10) in the embodiment of FIGS. 2–4. The principle of operation of this embodiment is similar, in that light rays (14) that enter the opening are substantially tangential to the curvature of the tube. Thus, such light rays are guided along the length of the tube where they are attenuated by a light absorbent coating, such as flat black paint or the like.

The light trap according to the invention provides a simple and inexpensive structure for preventing the back scattering of light that enters the opening to the light trap. As described previously, the light trap according to the invention can be manufactured in only two parts, and requires no interior structures whatsoever, other than the application of a light absorbent surface coating. Accordingly, the light trap according to the invention is easily and inexpensively manufactured.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A light trap, comprising:

a hollow spheroidal enclosure;

a hollow elongate chimney which intersects with and forms an opening into an interior of said spheroidal enclosure, said opening being defined by an intersection of said chimney and said spheroidal enclosure; wherein interior surfaces of the chimney and the sphere are coated with a light absorbing material; and a longitudinal axis of said elongate chimney is eccentric to a center point of said spheroidal enclosure.

2. The light trap according to claim 1, wherein:

said spheroidal enclosure comprises a sphere; and said chimney comprises a cylinder.

3. The light trap according to claim 1, wherein at said intersection, a longitudinal surface of said chimney is substantially tangent to said spheroidal enclosure.

4. The light trap according to claim 2, wherein at said intersection, a longitudinal surface of said chimney is substantially tangent to said spheroidal enclosure.

5. The light trap according to claim 1, wherein the opening formed by the intersection of the chimney has an area which is no greater than approximately 5 percent of total surface area of the enclosure.

6. The light trap according to claim 1, wherein the chimney has a lip in the form of a radially inwardly extending flange disposed at an external opening of the chimney.

7. A radiation trap, comprising:

a hollow spheroidal enclosure;

a hollow elongate chimney forming an opening in said spheroidal enclosure and positioned relative to the spheroidal enclosure such that radiation that passes through said chimney enters said spheroidal enclosure eccentric to a center of said spheroidal enclosure;

wherein an interior surface of the chimney and the interior surface of the spheroidal enclosure are coated with a light absorbent material.

8. The radiation trap according to claim 7, wherein said chimney is positioned relative to said spheroidal enclosure such that radiation which passes through said chimney enters said spheroidal enclosure approximately tangent to an interior surface thereof.

9. The radiation trap according to claim 7, wherein the opening formed by intersection of the chimney and the spheroidal enclosure has an area that is no greater than approximately 5 percent of total surface area of the enclosure.

10. The radiation trap according to claim 8, wherein the opening formed by the intersection of the cylindrical chimney has an area that is no greater than approximate 5 percent of total surface area of the enclosure.

11. The radiation trap according to claim 7, wherein at an intersection between said spheroidal enclosure and said chimney, a longitudinal surface of said cylindrical chimney is substantially tangent to said spheroidal enclosure.

12. The radiation trap according to claim 8, wherein at an intersection between said spheroidal enclosure and said chimney, a longitudinal surface of said cylindrical chimney is substantially tangent to said spheroidal enclosure.

13. An electromagnetic radiation trap, comprising:
- a hollow elongate member having an opening for receiving light, and defining a light path along a longitudinal axis thereof;
- a hollow spheroidal member connected to receive light traversing said light path through said elongate member; wherein
- interior surfaces of said elongate member and of said spheroidal member are coated with a light absorbent material; and
- said light path enters said spherical member in proximity to a tangent to the interior surface of the spheroidal member.

14. The electromagnetic radiation trap according to claim 13, wherein at said spheroidal member comprises a sphere, and said chimney comprises a cylinder.

* * * * *